3,365,467
15-KETO-16,16-DIHALOTESTOLOLACTONES
Patrick A. Diassi, Westfield, Saul L. Neidleman, Lawrence Township, and Samuel C. Pan, Metuchen, N.J., assignors to E. R. Squibb & Sons, Inc., New York, N.Y., a corporation of Delaware
No Drawing. Continuation-in-part of application Ser. No. 490,118, Sept. 24, 1965. This application Oct. 22, 1965, Ser. No. 502,497
5 Claims. (Cl. 260—343.2)

ABSTRACT OF THE DISCLOSURE

This invention relates to 16,16-dihalo-17a-oxa-D-homo-androst-ene-3,15,17-triones and their 1,2-dehydro derivatives, which are useful as protein-anabolic agents. The compounds are prepared either chemically or enzymatically by halogenating 15-keto-1-dehydrotestololactone or 15-keto-testololactone.

---

This application is a continuation-in-part of application Ser. No. 490,118, filed Sept. 24, 1965, and now abandoned.

This invention relates to, and has for its object, the provision of compounds of the general formula

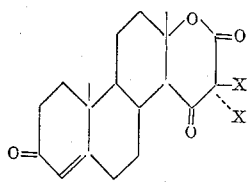

wherein the 1,2-position is saturated or double bonded, and X is halogen, preferably bromine and chlorine. These compounds are pharmacologically-active substances, useful as protein-anabolic agents. Hence the new compounds of this invention can be used in lieu of known protein-anabolic steroids, and may be administered either perorally or parenterally in the treatment of post-operative shock and other conditions where tissue degeneration has occurred, being formulated for such administration in the same type of preparations as testosterone, for example, with concentration and/or dosage based on the activity of the particular compound. Unlike testosterone, however, the compounds of this invention have no androgenic activity.

The compounds of this invention can be prepared either chemically or enzymatically by halogenating 15-keto-1-dehydrotestololactone or 15 - ketotestololactone. The chemical conversion is effected by treating these 15-ketotestololactones with a source of positive halogen, such as an N-haloamide or imide, e.g., an N-halo(lower alkanoic acid amide), as exemplified by N-bromoacetamide and N-chloroacetamide; or an N-halo(lower alkanedioic acid imide), as exemplified by N-bromosuccinimide, N-chlorosuccinimide and N-iodosuccinimide.

The enzymatic conversion is effected by treating 15-keto-1-dehydrotestoloactone or 15-ketotestololactone under aerobic conditions, to the action of a halogenating enzyme and a halide salt in the presence of hydrogen peroxide.

As source of the halogenating enzyme, the microorganism Caldariomyces fumago may be used. The microorganism can be grown as a static culture on Czapek-Dox medium at room temperature for 14–20 days. The halogenating enzyme is prepared as a water extract of an acetone powder of the microorganism.

In addition to the halogenating enzyme, hydrogen peroxide must also be present in the reaction mixture. Although hydrogen peroxide itself may be added to the mixture, the hydrogen peroxide may be prepared in situ by use of a peroxide producing enzyme system. Such enzyme systems are well known in the art and include glucose oxidase in the presence of glucose, D- and L-amino acid oxidases in the presence of D- or L-methionine, and diamine oxidase in the presence of histamine. Although substantially any concentration of hydrogen peroxide may be used, preferably the hydrogen peroxide is present in a molar ratio of about 0.1 to 1 to about 100 to 1 (optimally about 1 to 1 to about 10 to 1) based on the weight of the steroid. If a peroxide producing enzyme system is used, the concentration of the enzyme is so adjusted to yield the same concentration of hydrogen peroxide as stated above.

The reaction is preferably conducted at a pH in the range of about 2.2 to about 6, optimally about 2.2 to about 4 and most advantageously at pH 3.0 in the presence of hydrogen peroxide and about 4 to about 6, most advantageously at pH 5 in the presence of enzymatically produced hydrogen peroxide. To assure that the pH of the reaction mixture is maintained in this range, a buffering agent which buffers in the desired pH range is preferably also added to the reaction medium. Suitable buffers include McIlvaine's buffer, potassium citrate buffer, sodium acetate buffer, potassium phosphate buffer and potassium formate buffer.

The reaction is carried out in an aqueous medium under aerobic conditions, normally at a temperature in the range of about 20° C. to about 30° C. The components of the medium, namely, the steroid, buffering agent, halogenating enzyme, and hydrogen peroxide source are merely mixed with water and the resultant mixture agitated or shaken to assure adequate aeration for about 10 to about 200 minutes (optimally about 30 minutes to about 240 minutes).

Although the halogenating enzyme acts merely as a catalyst and hence can be present in any proportion, to assure maximum conversion of the starting steroid to the desired final product, the enzyme is prepared by grinding the acetone powder of the microorganism with ten times its weight of acid washed sand in distilled water, 20–30 ml./gm. acetone powder, for 2–5 minutes. One milliliter of the extract is used to convert about 1 mg. steroid in the presence of the appropriate additives.

Among the utilizable halide salts, the preferred salts are those of alkali metals, such as sodium bromide, potassium bromide, potassium chloride and sodium iodide. The salts are preferably present in excess of the stoichiometric amount required.

The following examples illustrate the invention (all temperatures being in centigrade):

EXAMPLE 1

*16,16-dibromo-17a-oxa-D-homoandrost-1,4-diene-3,15,17-trione*

To a solution of 157 mg. of 15-keto-1-dehydrotestololactone and 190 mg. of N-bromosuccinimide in 10 ml. of purified dioxane, 4 ml. of an acetic-acid-sodium acetate buffer containing 6.6 g. of sodium acetate and 6.6 ml. of acetic acid per 100 ml. of solution are added and the mixture left at room temperature for thirty minutes. The solution is then slowly diluted with water and the crystals which separate are filtered, washed with water and dried to give about 154 mg. of 16,16-dibromo-17a-oxa-D-homo-androst-1,4-diene-3,15,17-trione having a melting point about 186–188°, $[\alpha]_D^{25}$ −51° (chloroform), $\lambda_{max.}^{alc.}$ 238 m$\mu$ ($\epsilon$, 17,200), $\lambda_{max}^{Nujol}$ 5.80 (sh), 5.87, 6.00, 6.16 6.22$\mu$, $\tau_{DCCl_3}^{Si(CH_3)_4}$ 3.00 (d, J=10, 1–H), 3.73 (m, 2–H), 3.88 (m, 4–H), 6.83 (d, J=10, 14$\alpha$–H), 8.67 (s, 18–CH$_3$), 8.74 (s, 19–CH$_3$)

3

*Analysis.*—Calcd. for $C_{19}H_{20}O_4Br_2$ (472.18); C, 48.32; H, 4.27; Br, 33.85. Found: C, 48.46; H, 4.43; Br, 33.93.

EXAMPLE 2

*16,16-dibromo-17a-oxa-D-homoandrost-1,4-diene-3,15,17-trione*

To 100 ml. of a *Caldariomyces fumago* ATCC 16373 (American Type Culture Collection, Rockville, Md.), halogenating enzyme solution, prepared by grinding 6 g. of the acetone powder of this organism with 60 g. of acid washed sand and 150 ml. of water for 5 minutes, then centrifuging and filtering, are added 10 ml. of 0.3% hydrogen peroxide, 40 ml. of 0.3 M potassium phosphate buffer (pH 3.0), 100 mg. of potassium bromide, 100 mg. of 15-keto-1-dehydrotestololactone in 8 ml. of dimethylsulfoxide and 42 ml. of water. The mixture is placed on a rotary shaker at 25° for 30 minutes. The mixture is then extracted three times with 20 ml. portions of methyl isobutyl ketone which are combined, dried over sodium sulfate and evaporated to dryness in vacuo. The residue is then plate chromatographed using silica gel as the adsorbent and chloroform-80% methanol (50:1, v.:v.) as the developing solvent. The band at $R_f \approx 0.5$ detectable by U.V. light is eluted with chloroform-methanol (1:1, v.:v.). The eluant is then diluted with water, the chloroform separated, dried over sodium sulfate and evaporated in vacuo. Crystallization of the residue from acetone-hexane gives about 30 mg. of 16,16-dibromo-17a-oxa-D-homoandrost-1,4-diene-3,15,17-trione.

EXAMPLE 3

Following the procedure of Example 2 but substituting 2 g. of glucose and 400 mg. of glucose oxidase (Cal. Biochem. No. 34641, 1.6 Eu/mg. protein) for the hydrogen peroxide and 0.5 M potassium acetate-acetic acid buffer (pH 5.0) for the potassium phosphate buffer, there is obtained 16,16 - dibromo - 17a - oxa - D - homoandrost - 1,4-diene-3,15,17-trione.

EXAMPLE 4

Following the procedure of Example 2 but substituting 2 g. of L-amino acid oxidase and 400 mg. L-methionine for the hydrogen peroxide and 0.5 M potassium phosphate buffer pH 6.0 for the 0.3 M potassium phosphate buffer pH 3.0, there is obtained 16,16-dibromo-17a-oxa-D-homoandrost-1,4-diene-3,15,17-trione.

EXAMPLE 5

Following the procedure of Example 3 but substituting the same quantity of diamine oxidase for the glucose oxidase and the same quantity of histamine for the glucose, there is obtained 16,16-dibromo-17a-oxa-D-homoandrost-1,4-diene-3,15,17-trione.

EXAMPLE 6

*16,16-dichloro-17a-oxa-D-homoandrost-1,4-diene-3,15,17-trione*

Following the procedure of Example 1 but substituting 144 mg. of N-chlorosuccinimide for the N-bromosuccinimide, there are obtained about 132 mg. of 16,16-dichloro-17a-oxa-D-homoandrost-1,4-diene-3,15,17-trione having a melting point about 245–247°, $[\alpha]_D^{25}$ —66° (chloroform), $\lambda_{max}^{alc.}$ 239 m$\mu$ ($\epsilon$, 15,200), $\lambda_{max}^{Nujol}$ 5.69 (sh), 5.78, 6.01, 6.18, 6.24$\mu$, $\tau_{DCCl_3}^{Si(CH_3)_4}$ 2.99 (d, J=10 c.p.s., 1–H), 3.75 (d, d, J=2, 10 c.p.s., 2–H), 3.89 (s, 4–H), 6.91 (d, J=10, 14$\alpha$–H), 8.64 (s, 18–CH$_3$), 8.73 (s, 19–CH$_3$)

*Analysis.*—Calcd. for $C_{19}H_{20}O_4Cl_2$ (383.26): C, 59.54; H, 5.26; Cl, 18.50. Found: C, 59.45; H, 5.42; Cl, 18.41.

EXAMPLE 7

Following the procedures of Examples 2 to 5 but substituting potassium chloride for the potassium bromide, there is obtained 16,16-dichloro-17a-oxa-D-homoandrost-1,4-diene-3,15,17-trione.

EXAMPLE 8

*16,16-dibromo-17a-oxa-D-homoandrost-4-ene-3,15,17-trione*

(a) *Preparation of 15α-hydroxytestololactone.*—To 50 ml. of a medium consisting of 6 g./l. of corn steep liquor, 2.5 g./l. of yeast extract, 10 g./l. of dextrose, 3 g./l. of ammonium dihydrogen phosphate, 2.5 g./l. of calcium carbonate and 2.2 g./l. of soybean oil contained in a 250 ml. Erlenmeyer flask, a stock culture of Penicillium sp. ATCC 11598 on nutrient agar slants is inoculated. The flasks are incubated at 25° on a rotary shaker run at 280 r.p.m. with a stroke of 2″. After 67 hours, the contents of the whole flask are used to inoculate 1 liter of the same medium in a 4 liter Erlenmeyer flask. At the time of inoculation, 1 g. of testololactone dissolved in 15 ml. of dimethylformamide and sterilized by filtration through a Seitz pad is added. The flask is incubated at an inclined position on a reciprocating shaker run at 110 cycles per minute with a stroke of 2″. After 6 days the broth is filtered on a Buchner funnel with the aid of filter cell and the filtrate extracted three times with 350 ml. portions of chloroform. The combined chloroform extracts are washed twice with 500 ml. portions of water and evaporated to dryness, in vacuo. Crystallization of residue from acetone-hexane gives 15α-hydroxytestololactone.

(b) *Preparation of 15-ketotestololactone.*—To a solution of 70 mg. of 15α-hydroxytestololactone in 10 ml. of dioxane, 0.3 ml. of an aqueous solution containing 200 mg./ml. of chromic anhydride and 320 mg./ml. of sulfuric acid is added dropwise over a five minute period. After an additional fifteen minutes a few drops of methanol are added to decompose the excess oxidizing agent and the dioxane is decanted from the precipitated chromic sulfate. The dioxane is diluted with 10 ml. of water and extracted twice with 10 ml. portions of chloroform. The combined chloroform extracts are then washed with water and evaporated to dryness, in vacuo. Crystallization of the residue from acetone-hexane gives about 31 mg. of 15-ketotestololactone having M.P. about 230–232°.

(c) *Preparation of 16,16-dibromo-17a-oxa-D-homoandrost-4-ene-3,15,17-trione.*—To a solution of 158 mg. of 15-ketotestololactone and 190 mg. of N-bromosuccinimide in 10 ml. of purified dioxane, 4 ml. of an acetic-acid-sodium acetate buffer containing 6.6 g. of sodium acetate and 6.6 ml. of acetic acid per 100 ml. of solution are added and the mixture left at room temperature for thirty minutes. The solution is then slowly diluted with water and the crystals which separate are filtered, washed with water and dried to give 16,16-dibromo-17a-oxa-D-homoandrost-4-ene-3,15,17-trione.

EXAMPLE 9

*16,16-dibromo-17a-oxa-D-homoandrost-4-ene-3,15,17-trione*

To 100 ml. of a *Caldariomyces fumago* ATCC 16373 (American Type Culture Collection, Rockville, Md.), halogenating enzyme solution, prepared by grinding 6 g. of the acetone powder of this organism with 60 g. of acid washed sand and 150 ml. of water for five minutes, then centrifuging and filtering, are added 10 ml. of 0.3% hydrogen peroxide, 40 ml. of 0.3 M potassium phosphate buffer (pH 3.0), 100 mg. of potassium bromide, 100 mg. of 15-ketotestololactone in 8 ml. of dimethylsulfoxide and 42 ml. of water. The mixture is placed on a rotary shaker at 25° for 30 minutes. The mixture is then extracted three times with 20 ml. portions of methyl isobutyl ketone which are combined, dried over sodium sulfate and evaporated to dryness in vacuo. The residue is then plate chromatographed using silica gel as the adsorbent and chloroform-80% methanol (50:1, v.:v.) as the developing solvent. The band at $R_f \approx 0.5$ detectable by U.V. light is eluted with chloroform-methanol (1:1, v.:v.). The eluant is then diluted with water, the chloroform separated, dried over sodium sulfate and evaporated in vacuo. Crystallization of the residue from acetone-hexane gives about 30 mg. of 16,16-dibromo-17a-oxa-D-homoandrost-4-ene-3,15,17-trione.

EXAMPLE 10

*16,16-dichloro-17a-oxa-D-homoandrost-4-ene-3, 15,17-trione*

Following the procedure of Example 8(c) but substituting 144 mg. of N-chlorosuccinimide for the N-bromosuccinimide, there are obtained 16,16-dichloro-17a-oxa-D-homoandrost-4-ene-3,15,17-trione.

EXAMPLE 11

Following the procedure of Example 8(c) but substituting protassium chloride for the potassium bromide, there is obtained 16,16-dichloro-17a-oxa-D-homoandrost-4-ene-3,15,17-trione.

The invention may be variously otherwise embodied within the scope of the appended claims.

What is claimed is:
1. A compound selected from the group consisting of steroids of the formula

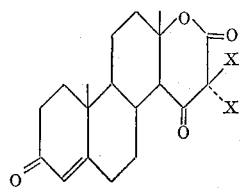

wherein X is selected from the group consisting of iodine, bromine and chlorine, and the 1-dehydro derivatives thereof.

2. 16,16 - dibromo - 17a-oxa-D-homoandrost-1,4-diene-3,15,17-trione.
3. 16,16-dichloro-17a-oxa-D-homoandrost - 1,4 - diene-3,15,17-trione.
4. 16,16 - dibromo - 17a - oxa-D-homoandrost-4-ene-3,15,17-trione.
5. 16,16-dichloro-17a-oxa-D-homoandrost - 4 - ene - 3, 15,17-trione.

References Cited

UNITED STATES PATENTS

| 2,837,464 | 6/1958 | Nobile | 260—343.2 |
| 3,083,210 | 3/1963 | Diassi et al. | 260—343.2 |

JAMES A. PATTEN, *Primary Examiner.*